3,294,733
PROCESS OF PRODUCING DISPERSANT FREE CARBON BLACK SLURRIES AND RUBBER MASTERBATCHES CONTAINING SAME
Avrom I. Medalia and Erivan Hagopian, Newton, Mass., assignors to Cabot Corporation, Boston, Mass., a corporation of Delaware
Filed Mar. 29, 1962, Ser. No. 183,674
8 Claims. (Cl. 260—41.5)

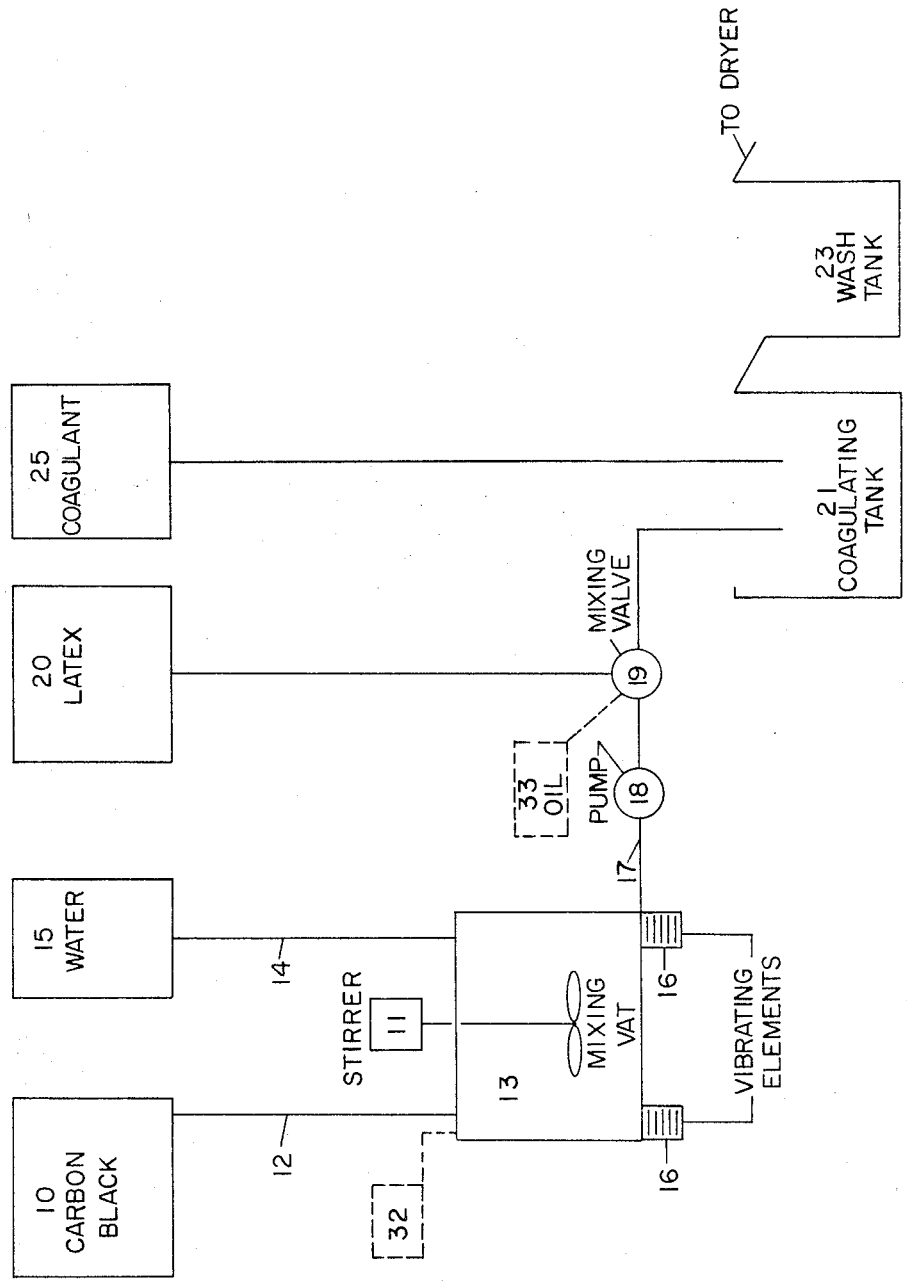

This invention relates to carbon black. More particularly it is concerned with a method of reducing the viscosity of concentrated slurries of carbon black in aqueous liquid media so as to render same capable of being handled and processed efficiently and economically in commercial operations. Also contemplated within the scope of the present invention is apparatus and an arrangement thereof especially adapted for practicing our invention.

Approximately 300,000,000 lbs. of carbon black per year are presently being incorporated into rubber by the latex masterbatching procedure, in most cases by a dispersant-free process. In such a process, a carbon black slurry is prepared in water without the addition of dispersing agent or other such additive. Various types of high shear equipment such as colloid mills, high speed stirrers, homogenizers, and the like are presently utilized in the commercial preparation of such slurries. Such equipment is necessary in order to insure a good dispersion of the black in the slurry so that when the slurry is blended with the latex a uniform composition will result. After preparation, the slurry is generally pumped into a mixing valve or chamber where it is blended with the latex and oil, and other compounding ingredients, if desired, after which the composition is coagulated. Although in many present commercial processes the average lifetime of a carbon black slurry is relatively short, sometimes being only a matter of seconds, nevertheless, the viscosity of the slurry and the state of dispersion of the carbon black therein are still of prime importance in determining the quality of the ultimate masterbatch product.

Although the exact rheological behavior of carbon black slurries is not too well known, it is generally known that well dispersed, dispersant-free slurries of many of the most popular carbon blacks are highly viscous at relatively low concentrations. For example, almost any slurry of a reinforcing carbon black having a black concentration above about 10% by weight exhibits pronounced pseudoplastic behavior, that is to say, it will flow very little at low applied forces but can be made to flow by application of high stress. Accordingly, in present commercial practice, in order to avoid problems in transporting such slurries, most carbon black slurries are handled at extremely low and rather inefficient concentrations—generally between about 4 and 6% by weight. Slurries having concentrations of reinforcing carbon black greater than about 6% generally have viscosities which are too high to permit pumping and handling in a practical manner with conventional equipment. Also, present commercial practice sometimes involves the use of suspension stabilizing agents or dispersing agents in carbon black slurries in order to increase somewhat the maximum allowable concentration of black in such slurries. However, the use of dispersing agents and the like is generally avoided wherever possible in commercial practice because of the many undesirable ramifications implicit in their use including the cost thereof and because of possible adverse effects caused thereby, e.g., in the curing of the final masterbatch product. Obviously then, any process whereby stable, essentially dispersant-free carbon black slurries having concentrations of black heretofore avoided because of the complications involved in the handling thereof, can be rendered capable of being easily handled and utilized in commercial practice would be a notable contribution to the art.

The fundamental object of the present invention is to provide a process for producing essentially dispersant-free carbon black slurries which flow readily without applying high stress forces thereto even though the concentration of carbon black therein is sufficient to impart very high apparent viscosities and pseudoplastic behavior to said slurries when the black is first dispersed thoroughly therein.

Another object of the present invention is to present a process whereby extremely stable and readily flowable slurries of carbon black containing concentrations of carbon black up to about 25% by weight and even somewhat higher can be produced.

Still another object of our invention is to provide an efficient, substantially continuous, integrated masterbatch process wherein readily flowable slurries of carbon black containing relatively high concentrations of black therein are utilized.

Other objects of the present invention will appear hereinafter or will be obvious to those well skilled in the art.

The above objects are accomplished in accordance with the present invention by dispersing a carbon black in water or a liquid media consisting primarily of water under conditions of high shear to produce a highly viscous, pseudoplastic slurry thereof and thereafter subjecting said pseudoplastic slurry to conditions of moderate shear. We have discovered that a surprising decrease in viscosity is rapidly effected in slurries produced under conditions of high shear when they are subsequently agitated under conditions of moderate or mild shear. In other words, when conditions of moderate shear are applied to the original highly viscous pseudoplastic like slurry, the slurry becomes readily flowable and is then readily transportable without the application of forces of high stress thereto.

Obviously, any attempt to assign an absolute value to the term, "high shear" would be almost impossible since this would require consideration of such details as the particular apparatus utilized to develop same, the type and physical condition of carbon black being dispersed, e.g., HAF, SAF, etc., and other such considerations peculiar to the particular slurry being formed. However, those well skilled in the art are well aware of the results which are obtained by the application of "high shear" by means of such high shear type apparatus as colloid mills, homogenizers, high-speed stirrers, turbine mixers, centrifugal impeller mixers, Waring Blendors and the like to carbon black slurries. The application of high shear to such slurries generally very rapidly disperses the black therein and effects a substantial increase in the viscosity thereof. Moreover, it is also generally well known to those skilled in the art that the ultimate viscosity of a slurry produced by the application of conditions of high shear generated by a particular high shear type apparatus will be determined primarily by the type of black and concentration thereof utilized. For example, it is known that blacks of coarse particle size such as SRF and GPF carbon blacks may be dispersed by conditions of high shear in essentially dispersant-free aqueous systems at concentrations of about 6–7% by weight without producing slurries which are so viscous that they cannot be effectively transported in a practical manner. On the other hand, slurries containing well dispersed blacks of finer particle size such as SAF and ISAF carbon blacks in concentrations of about 6–7% by weight are already extremely viscous and difficult to handle. Moreover, even for those blacks having substantially the same particle size but differing in "structure" properties, the initial viscosity of well dispersed slurries thereof at a given concentration will vary directly with the "structure" properties. Accordingly, we find that the term, "high shear" is best defined according to the results obtained by the application thereof to those carbon black slurries having concentrations of black of interest to the process of the present invention. Thus, for the purposes of the present invention, the term, "high shear" refers to the intense, vigorous high speed type of mixing action which is capable of thoroughly dispersing carbon black in a liquid vehicle, this capability being best indicated by the actual achievement by means of such mixing action of an apparent viscosity of at least about 150 centipoises (as measured by a falling plunger type viscosimeter at a shear rate of 242 reciprocal seconds) in slurries containing a minimal concentration of black from only about 5 or 6% by weight for the more reinforcing furnace black such as SAF up to only 8 to 10% by weight for the less reinforcing furnace blacks such as GPF or SRF. Slurries having apparent viscosities substantially below the above-mentioned minimum viscosity may generally be transported by conventional equipment without any serious complications. However, carbon black slurries having apparent viscosities greater than 150 centipoises are generally troublesome to transport and those slurries having apparent viscosities greater than 200 centipoises are especially difficult to transport and accordingly constitute those slurries to which the teachings of the present invention best apply. Also, the term, "mild" or "moderate" shear connotes a gentle, non-violent, low speed form of agitation or mixing, considerably slower and less intense, for example, than the minimum required by itself to disperse carbon black effectively in a liquid vehicle. Accordingly, for the purposes of the present invention, "mild" or "moderate" shear is perhaps best defined as a relatively low shear type of mixing action which is considerably less vigorous than that capable of thoroughly dispersing carbon black in a liquid medium as indicated by an inability to achieve an apparent viscosity of as high as 150 centipoises, even on prolonged mixing, with black concentrations at which the high shear mixing action referred to above readily result in apparent viscosities above about 150 centipoises. For example, we have found that, in a 1 quart capacity Waring Blendor designed by the manufacturer to operate at a maximum speed of about 15,000 r.p.m., "high shear" mixing action is obtained in the speed range above about 5,000 r.p.m. whereas "moderate shear" is obtained only below about 3,000 r.p.m. and preferably below 2,000 r.p.m. in this same apparatus. Actually, in practice it is usually preferable to obtain the "moderate shear" mixing action needed in this invention by means of a separate apparatus which will normally be of a different type from that used to achieve the "high shear" mixing action. For example, change can mixers, paddle or propellor stirrers, ribbon mixers or vibrating equipment such as paint shakers among others, and even the action of certain types of pumps, may be used to apply mild shear to the viscous slurries.

We have discovered that surprisingly stable, readily flowable, aqueous slurries of carbon black completely acceptable for masterbatching procedures and containing concentrations from about 10 to about 25% black by weight, for example, up to about 35 parts black for each 100 parts of aqueous liquid are obtained by the practice of our invention. For example, when a fine particle size black in concentrations greater than about 6% is mixed with water in a Waring Blendor under conditions of mild shear, e.g., 1700 r.p.m. for 15 minutes, the resulting slurry had an apparent viscosity of only 22 centipoises, and, even after prolonged exposure to such conditions of mild shear, the resulting viscosity does not even approach the apparent viscosity of 150 centipoises which is attainable in only a few minutes at high shear. Moreover, the resulting slurry is very coarse and unstable, e.g., the carbon black settles out very rapidly even when maintained under conditions of moderate shear. Also, the inferior degree of dispersion obtained by the low shear is attested to by the fact that as much as 5% of the black in the slurry will not pass through a 30-mesh screen. Accordingly, slurries prepared by the application of only mild shear do not produce satisfactory masterbatch products. In contrast thereto our slurries which are dispersed by conditions of high shear and subsequently thinned by the application of mild shear are remarkably stable. For example, no settling of black is observed in such slurries when they are maintained under conditions of mild shear or agitation and even in the absence of such mild agitation the carbon black in our thinned slurries settles out only very gradually over an extended period of time. We have also found that the reduction of the viscosity of highly concentrated, originally highly viscous slurries is a reversible process, that is to say, when the highly concentrated, stable, readily flowable slurries produced in accordance with our invention are again subsequently subjected to conditions of high shear, the apparent viscosity thereof is very rapidly increased again to the neighborhood of the original value. This reversibility can, therefore, be a source of trouble if the thinned, flowable slurries of the present invention were subsequently transported by pumps or other such apparatus capable of generating conditions of high shear, e.g., a high-speed centrifugal pump. Accordingly, when the teachings of our invention are utilized in the masterbatch process, we prefer to continually maintain the flowable slurries produced thereby under conditions of mild shear and also utilize apparatus in transporting these which will not subject same to conditions of high shear in order to both maintain and insure their stability and their reduced viscosity.

Although the practice of our invention applies to dispersant-free, primarily aqueous slurries of carbon black, certain definite advantages flow from the practice of our invention when a proper amount of oil is added to the slurries prior to the mixing thereof with the latex. One special advantage is that the oil-containing black slurries are much more stable and also somewhat further reduced in viscosity. Accordingly, by establishing the proper balance of oil to black, stable, essentially dispersant-free, readily flowable slurries having reinforcing black concentrations of up to about 25% by weight or somewhat higher, for example, up to about 45 parts black per 100 parts liquid may be prepared by the practice of the present invention. Moreover, we have found that even at such high concentrations, the black phase in such slurries does not settle out substantially on standing. We have used both mineral oil and an aromatic compounding oil for natural and synthetic polymers in amounts of from 10 to 56 parts of oil per 100 parts by weight of black. The latter amount (56 parts) corresponds to a level of oil which would be equivalent to a typical oil-extended masterbatch containing approximately 37½ parts of oil per hundred parts of polymer. Accordingly, a specific embodiment of the present invention embraces extremely stable, readily flowable carbon black slurries containing as much as 25% by weight of carbon black together with from about 10 to about 60 parts of oil per hundred parts of carbon black.

We are unable to explain precisely why the application of mild or moderate shear so effectively reduces the viscosity of the highly viscous pseudoplastic carbon black slurries to a range wherein such previously non-flowable slurries take on liquid-like characteristics and are readily flowable under low stress. According to a hypothesis which we have postulated—but to which we do not intend to be bound—the high shear forces originally applied to the slurry break up the secondary aggregates of the black to disperse the black uniformly throughout the slurry. When the shear is removed the chain-like aggregates very quickly unite with each other forming a network structure and the slurry takes on a highly pseudoplastic nature. We believe that the mild agitation or mild shear breaks up the network structure, forming small clusters or aggregates which are more compact and have less contact with each other so that the previously, highly viscous, non-flowable slurry takes on predominately liquid like characteristics. Our hypothesis is supported by conductivity measurements of the initial highly viscous slurries of various blacks and of those "thinned" by our process. The viscous slurries have conductivities which are quite high, but, on thinning by mild agitation, the conductivity thereof drops to about half of its original value. Also the above hypothesis is consistent with our observations of the behavior of slurries of the various types of carbon black when the teachings of our invention are applied thereto. We have found, for instance, that, for a given black concentration, the initial viscosity of slurries of the blacks of different primary particle size appears to decrease somewhat as the particle size of the black increases. We believe that the coarser blacks form less extensive networks with fewer through going chains and accordingly their networks are less rigid than those formed by the finer blacks.

The practice of our invention in the latex masterbatch process will be better understood by reference to the attached drawing in which FIGURE 1 is a flow diagram illustrating schematically an integrated arrangement of apparatus suitable for practicing the process of our invention.

Referring now to FIGURE 1, carbon black in either pelleted or fluffy form is metered from storage tank 10 through line 12 into mixing vat 13. Water from reservoir 15 is added in metered amounts to mixing vat 13 through line 14. The amount of water added to mixing vat 13 is limited to produce a slurry having a carbon black concentration generally in excess of about 7% by weight. Also if desired, minor amounts of oil or other liquids may be added to vat 13 from tank 32. In communication with the slurry in mixing vat 13 is apparatus which is capable of generating high shear such as a high speed stirrer 11. It is to be understood that almost any type of apparatus such as homogenizers, ball mills, colloid mills, etc., which will subject the black to violent shear action may be utilized to disperse the black in the slurry rather than the illustrated stirrer 11. After subjecting the slurry in vat 13 to violent shearing action, the slurry will generally very rapidly attain a very high viscosity and become pseudoplastic in nature, that is to say, the consistency thereof, depending upon the concentration of black, will vary from that of a gelatinous mass to that of a paste like mass. Thereafter, the highly viscous slurry is subjected to mild agitation which may be applied to the viscous slurry in many ways such as by operating stirrer 11 at greatly reduced speeds or by gently vibrating vat 13 by vibrating means 16. Upon application of the mild, gentle agitation, the highly viscous slurry becomes flowable and the viscosity thereof is greatly reduced. Because of the reversible nature of the phenomenon which we have discovered, considerable care must be taken in the proper selection of a pump 18 to be used to transport the highly concentrated fluid slurry to a mixing valve 19. The pump must be of a type which will not produce high shear or else the thinned slurry will again become viscous and plugging will result. We have found that most of the present commercial centrifugal and diaphram pumps are not suitable for transporting the thinned slurries produced in accordance with our invention. A peristaltic type pump such as a Moyno pump or a Sigma pump is most suitable since such generate only mild shear. We have found moreover, that the highly viscous slurry may be thinned in many cases merely by subjecting same to the influence of the action of a peristaltic type pump. Thus, in some instances the very mild shear generated by a peristaltic type pump 18 may be utilized alone to thin the slurry produced in vat 13 without any other application of mild shear or agitation to the highly viscous slurry produced by the high shear apparatus 11 and the process would be essentially continuous in operation. When pump 18 is used exclusively to apply low shear to the slurry produced in 13, the distance 17 between pump 18 and 13 should be as short as possible and generally no greater than about two feet. In this manner, pump 18 will receive the viscous slurry almost immediately after the formation thereof. Whether the process is continuous or batch type, the thinned slurry is conveyed by a peristaltic type pump to a mixing valve 19 wherein latex from latex supply 20 and oil, if required or desired, from tank 33 is mixed therewith in desired amounts. Thereafter the latex black mixture is transported to coagulating tank 21 wherein the mixture is coagulated by coagulant delivered from coagulant supply 25. The resulting coagulated mixture overflows from coagulating tank 21 to wash tank 23. In wash tank 23, the rubber crumb having carbon black uniformly dispersed therein is separated from the serum and the crumb is thereafter passed to a dryer (not shown).

The following illustrative, non-limiting, examples are presented so that a fuller understanding of our invention will be obtained. All of the apparent viscosities given in the following examples were obtained by a falling plunger type viscosimeter at a shear rate of 242 reciprocal seconds.

*Example 1*

A 10% by weight slurry of Sterling V, a general purpose furnace black having an average particle size of about 51 millimicrons was prepared in water by mixing 50 g. of dry carbon black pellets in 450 g. of distilled water in a quart-size Waring Blendor assembly. The mixing was effected at high speed (10,000 r.p.m.) for 10 minutes. The mixture was kept cool (24–26° C.) by passing cooling water through a heat exchanger bulb in the Waring Blendor jar. The apparent viscosity of the freshly prepared slurry as measured with a falling plunger type of viscosimeter was 200 centipoises at 25° C. Another carbon black slurry was prepared in an identical manner, and the jar was then transferred to a Waring Blendor having a slow speed drive where the slurry was agitated for 10 minutes at 975 r.p.m. The apparent viscosity of the slurry after this lower speed mixing was 11 centipoises at 25° C.

*Example 2*

A 7% by weight slurry of Vulcan 3, a high abrasion furnace carbon black having an average particle size of about 29 millimicrons was prepared in water by mixing 35 g. of dry carbon black pellets in 465 g. of distilled water in a quart-size Waring Blendor assembly. The mixing was effected at high speed (10,000 r.p.m.) for 10 minutes. The mixture was kept cool (24–26° C.) by passing cooling water through a heat exchanger bulb in the Waring Blendor jar. The apparent viscosity of the freshly prepared slurry as measured with a falling plunger type of viscosimeter was 183 centipoises at 25° C. Another batch was prepared in an identical manner, and some of the slurry was then transferred to a 4-oz. jar with six ¼″-diameter stainless steel balls and tumbled for 10 minutes in a laboratory tumbler rotating at 57 r.p.m. The apparent viscosity of the slurry after tumbling was 27 centipoises at 25° C.

Example 3

A 10% by weight slurry of a high abrasion furnace carbon black in water was prepared by mixing 100 g. of dry carbon black pellets in 900 g. of distilled water with a Manton-Gaulin Model 2A–C-laboratory colloid mill. The mixing was effected by passing the black-water mixture once therethrough at the minimum setting of the rotor-stator gap (0.001). Cooling water was circulated through the jacket of the colloid mill. The apparent viscosity of the freshly prepared slurry as measured with a falling plunger type viscosimeter was estimated to be 640 centipoises at 25° C. The slurry was transferred to a paint shaker vibrating at a rate of 720 cycles per minute and shaken for 5 minutes. The apparent viscosity of the slurry after shaking was 92 centipoises at 25° C.

Example 4

An 18% by weight slurry of Vulcan 3, a high abrasion furnace carbon black, was prepared in water by means of a Manton-Gaulin Model 2A–C-laboratory colloid mill. The resulting slurry was of about the consistency of tooth paste and the viscosity thereof was not measurable by a falling plunger type viscosimeter. After agitating a half full can of the above slurry for 15 seconds on a paint shaker vibrating at a rate of 720 cycles/min., the resulting slurry was quite fluid, having an apparent viscosity of only 130 centipoises.

Example 5

In order to illustrate what we mean by the term, "high shear" and "low or moderate shear," and the effect of the application thereof to viscous slurries, various slurries of diverse furnace carbon blacks of varying particle size were dispersed in water in a quart-size Waring Blendor which was operated at a speed of about 10,000 r.p.m. for about 2 minutes. Subsequently, the slurries were subjected to mild shear by reducing the speed of the blendor to a speed of 1700 r.p.m. for about 5 minutes. The following data were obtained:

| Average Electron Microscope particle diameter (millimicrons) | Concentration, percent by weight in slurry | App. Visc. after application of "high shear" (centipoises) | App. Visc. after subsequent application of "low shear" (centipoises) |
|---|---|---|---|
| 51 | 10 | 200 | 10 |
| 51 | 15 | (1) | 37 |
| 29 | 7 | 184 | 30 |
| 29 | 18 | (1) | 114 |
| 20 | 6 | 214 | 96 |
| 20 | 7 | (1) | 125 |

[1] Too high to measure.

Example 6

In order to illustrate the effect of the application of "low or moderate" shear alone to a carbon black slurry containing 7% by weight of Vulcan 3, a high abrasion furnace black having an average electron microscope particle diameter of about 29 millimicrons was mixed in a quart-size Waring Blendor operated at a speed of 1700 r.p.m. for 15 minutes. The apparent viscosity of the resulting slurry was 22 centipoises. However, 5% by weight of the black failed to pass through a 30 mesh screen. In contrast thereto a slurry containing 7% by weight of Vulcan 3, after being subjected first to high shear (10,000 r.p.m. in Waring Blendor) for 2 minutes and then subjected to a speed of 1700 r.p.m. therein for 5 minutes had an apparent viscosity of 32 centipoises, but, upon screening same through a 30-mesh screen, all of the black therein passed through the 30-mesh screen. Thus, it will be obvious that the slurry produced by moderate shear above is so poorly dispersed that it could hardly be used to produce a suitable masterbatch product. Accordingly, by the practice of our invention a well dispersed slurry containing carbon blacks in concentrations heretofore avoided may be produced which are completely acceptable for subsequent mixture with latex to produce acceptable masterbatch products.

Example 7

An oil-containing, aqueous slurry having a carbon black concentration of about 17% Vulcan 3, and containing 57 parts of oil per hundred parts by weight of black was prepared on a colloid mill in which hot aromatic rubber compounding oil was fed slowly into the intake throat of the mill. The apparent viscosity of the slurry was 170 centipoises. The slurry was subsequently subjected to the action of a Waring Blendor operated at about 975 r.p.m. for about 10 minutes. The viscosity of the slurry after the application of such mild shear was 64 centipoises.

Comparison of the above results with the results reported in Example 4, indicate that the addition of oil to carbon black slurries decreases both the initial and "thinned" viscosities of the highly concentrated slurries, with the degree of improvement increasing as the oil concentration increases. Thus, it will be obvious that the addition of oil to carbon black slurries produced in accordance with our invention permits the use of substantially higher concentrations of black than the maximum of about 18–20% which may be produced with essentially aqueous, dispersant-free systems. When relatively large amounts of oil are used, e.g., about 60 parts of oil per 100 parts of black, we have found that the concentration of black may exceed 25%, especially in the case of the coarser blacks, while the maximum concentration with the finer blacks is about 25%. Also, we have found that the oil-containing slurries are more stable on standing than non-oil-containing, dispersant-free slurries. Accordingly, many advantages flow from the practice of our invention when same is applied to highly concentrated slurries of carbon black which contain oil.

Example 8

A black rubber masterbatch consisting, by weight, of 100 parts SBR 1500, a styrene butadiene rubber, 57.5 parts of a high abrasion furnace black, and 10 parts processing oil, was prepared at a rate of approximately 6 lbs. of dry masterbatch per hour. The oil was metered as a 20% by weight emulsion in water, the SBR as a latex containing 19% rubber solids by weight, and the carbon black as a 16% by weight slurry in water. The slurry was prepared by passing the pellets and water through a laboratory colloid mill at a gap setting of 0.005 inch. The slurry emerging from the colloid mill was a thick paste having a viscosity which was too high to measure. The apparent viscosity of this paste was reduced to approximately 75 centipoises by the application of mild shear effected by means of a paint shaking machine. This slurry of reduced viscosity was then metered with a peristaltic type pump (Sigma pump) at the proper rate into a mixer tube. The three separate streams, oil emulsion, latex, and aqueous carbon black slurry are combined in the mixer tube and the combined stream leaving the mixer tube is sprayed with a coagulating solution (salt and acid). The mixture was then allowed to flow into a coagulating tank. The masterbatch crumb was collected, washed, and dried.

Vulcanizate properties of the masterbatch and a dry mix control both cured at 292° F. are summarized below:

|  | Blk. Masterbatch | Dry Mix Control |
|---|---|---|
| Tensile Strength (p.s.i.) | 4,020 | 3,800 |
| 300% Modulus (p.s.i.) | 2,320 | 2,440 |
| Elongation (percent) | 510 | 480 |
| Hardness (Shore A2) | 70 | 70 |
| Angle Abrasion (Vol. Index) | 81 | 79 |
| DeMattia Cut Growth (KC-1.0) | 15 | 11 |
| Mooney Viscosity (ML 4 at 212° F.) | 70 | 67 |
| Dispersion Rating, percent | 99 | 99 |

It is to be understood that various modifications may be introduced to the procedure set forth in this example without departing from the spirit and scope of our invention. For example, the black-water slurry may be fed directly from the colloid mill to the peristaltic pump which is located as near as possible to the discharge of the colloid mill and the action of the pump will simultaneously thin the thick slurry and effectively transport same to the mixing means. Such a modification is especially desirable for commercial operations since a completely continuous process is then provided.

*Example 9*

In order to illustrate the effect of the shearing action of peristaltic pumps on the viscosity of carbon black slurries, a slurry containing 7% by weight of Vulcan 3, a high abrasion furnace black, was prepared under high shear and the apparent viscosity thereof was 186 centipoises. The apparent viscosity of the slurry was measured after one pass through a particular peristaltic type pump and after ten passes therethrough. The following data were obtained:

|  | Peristaltic Pumps | |
| --- | --- | --- |
|  | 1. Sigma | 2. Moyno |
| Apparent Viscosity After 1 pass (Centipoises) | 95 | 80 |
| Apparent Viscosity After 10 passes (Centipoises) | 45 | 30 |

The Sigma pump is a peristaltic type pump in which mechanical fingers squeeze a rubber tube through which the slurry flows. Likewise the Moyno pump is a peristaltic type pump which has a blunt screw turning inside a rubber sleeve. From the above data it will be obvious that both peristaltic type pumps are capable of generating mild shear, which effectively thins the initially thick slurry. Thus, we intend to include peristaltic type pumps and other low shear type pumps in the low shear type apparatus suitable for use in the present invention. Accordingly, a peristaltic type pump may be utilized alone both as the means for applying moderate shear to the thick carbon black slurries and also for transporting same.

*Example 10*

A portion of the 7% slurry of Example 9 was thinned in accordance with the teachings of our invention by subjecting the initially thick 7% slurry to the conditions of mild shear generated by a paint shaker. The so thinned slurry had an apparent viscosity of 28 centipoises. The slurry was then subjected to the action of the four pumps listed below. The following results were obtained:

|  | Centrifugal Pump | Diaphragm Pump | Peristaltic Pumps | |
| --- | --- | --- | --- | --- |
|  |  |  | 1. Sigma | 2. Moyno |
| Apparent Viscosity After 1 pass (centipoises) | 65 | 105 | 22 | 25 |
| Apparent Viscosity After 10 passes (centipoises) | 145 | 120 | 22 | 32 |

From the above, it will be seen that neither the centrifugal type pump nor the diaphragm type pump are as satisfactory for transporting the thinned slurries as the peristaltic type pumps because of the high shear generated thereby. The subsequent addition of high shear to the thinned slurries cause the viscosity thereof to increase substantially to the point where serious clogging may result, especially when more concentrated slurries are involved. On the other hand, the action of the peristaltic type pump does not adversely effect the reduced viscosity of the thinned slurry. Accordingly, in any continuous masterbatch process which utilizes the teachings of our invention, we prefer to maintain the thinned slurries under conditions of mild shear until such time as they are mixed with the latex and one method of effectively maintaining these conditions of mild shear is by means of a peristaltic type pump.

There are many modifications obvious to those skilled in the art which may be applied to our invention without departing from the spirit and scope thereof. Accordingly, our invention is limited only to those limitations specifically set forth in the present specification and in the following claims.

Having described our invention, what we declare as new and desire to secure by U.S. Letters Patents is as follows:

1. A process for producing essentially dispersant-free, readily flowable, highly concentrated carbon black slurries comprising:
    (a) combining at least 7% by weight of carbon black with a liquid medium composed primarily of water,
    (b) violently agitating the liquid medium containing said blacks under conditions of high shear until the resulting slurry attains an apparent viscosity of at least 150 centipoises, and
    (c) subjecting said agitated mixture to conditions of moderate shear, whereby said slurry is made readily transportable in a concentrated form by subjection to pumping action of the type imparting only moderate shear to said slurry.

2. The process of claim 1 wherein the apparent viscosity attained at step (b) in the said resultant slurry is greater than 200 centipoises.

3. The process of claim 2 wherein the said readily-flowable slurry comprises about 10 to about 35 parts of carbon black per 100 parts of liquid.

4. The process of claim 1 wherein the said readily-flowable slurry comprises about 10 to about 45 parts by weight of carbon black per 100 parts of liquid.

5. A process for producing rubber masterbatches comprising the steps of:
    (a) combining at least 7% by weight of carbon black with a liquid medium composed principally of water to form a dispersant-free slurry,
    (b) violently agitating the combined black and liquid under conditions of high shear until the resultant slurry attains an apparent viscosity of at least 150 centipoises,
    (c) subjecting said agitated mixture to conditions of moderate shear, whereby said slurry is made readily transportable in a concentrated form by subjection to pumping action of the type imparting only moderate shear to said slurry,
    (d) combining the resulting mixture with latex, and
    (e) coagulating the resulting product.

6. The process of claim 5 wherein the apparent viscosity attained at step (b) in the said resultant slurry is greater than 200 centipoises.

7. The process of claim 5 wherein the said mixture comprises about 10 to about 45 parts of carbon black per 100 parts of liquid and about 10 to about 60 parts of oil per hundred parts of carbon black.

8. The process of claim 7 wherein the said mixture comprises about 10 to about 35 parts of carbon black per 100 parts of liquid.

References Cited by the Examiner

UNITED STATES PATENTS

| | | | |
|---|---|---|---|
| 2,659,706 | 11/1953 | Fisk et al. | 260—33.6 |
| 2,769,795 | 11/1956 | Braendle | 106—307 |
| 2,867,540 | 1/1959 | Harris | 106—307 |
| 2,893,887 | 7/1959 | Voet | 106—307 |
| 3,048,559 | 8/1962 | Heller et al. | 260—33.6 |
| 3,060,050 | 10/1962 | Ells | 106—307 |
| 3,106,476 | 10/1963 | Millman et al. | 106—309 |
| 3,118,844 | 1/1964 | Forrester et al. | 106—307 |
| 3,152,996 | 10/1964 | Forrester | 106—307 |
| 3,203,922 | 8/1965 | Hanmer | 106—307 |

TOBIAS E. LEVOW, *Primary Examiner.*

ALEXANDER H. BRODMERKEL, *Examiner.*

W. D. ERICKSON, S. E. MOTT, *Assistant Examiners.*